(12) United States Patent
Levin

(10) Patent No.: US 10,992,005 B2
(45) Date of Patent: Apr. 27, 2021

(54) DEEP POUCH CELL AND METHOD OF MANUFACTURING SAME

(71) Applicants: Robert Bosch Battery Systems LLC, Orion, MI (US); Robert Bosch GmbH, Stuttgat (DE)

(72) Inventor: Eugene Levin, Rochester Hills, MI (US)

(73) Assignees: Robert Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 71 days.

(21) Appl. No.: 16/212,203

(22) Filed: Dec. 6, 2018

(65) Prior Publication Data

US 2020/0185668 A1    Jun. 11, 2020

(51) Int. Cl.
| | |
|---|---|
| *H01M 50/124* | (2021.01) |
| *H01M 10/0525* | (2010.01) |
| *H01M 10/0585* | (2010.01) |
| *H01M 50/116* | (2021.01) |

(52) U.S. Cl.
CPC ..... *H01M 50/124* (2021.01); *H01M 10/0525* (2013.01); *H01M 10/0585* (2013.01); *H01M 50/116* (2021.01)

(58) Field of Classification Search
CPC ................................................. H01M 2/02–08
See application file for complete search history.

(56) References Cited

U.S. PATENT DOCUMENTS

| | | |
|---|---|---|
| 7,976,981 B2 | 7/2011 | Lee |
| 8,492,025 B2 | 7/2013 | Lee |
| 9,136,510 B2 | 9/2015 | Werner |
| 9,246,139 B2 | 1/2016 | Hong |
| 2004/0048149 A1 | 3/2004 | Gross et al. |
| 2009/0311592 A1* | 12/2009 | You ...................... H01M 2/361 |
| | | 429/162 |

(Continued)

FOREIGN PATENT DOCUMENTS

| | | |
|---|---|---|
| EP | 3382771 | 10/2018 |
| KR | 20150061990 A * | 6/2015 |

(Continued)

OTHER PUBLICATIONS

Machine translation of KR2015-0061990A (Year: 2015).*
PCT International Search Report for PCT/EP2019/080545.

*Primary Examiner* — Eric R Smith
(74) *Attorney, Agent, or Firm* — Kelly McGlashen; Maginot, Moore & Beck LLP

(57) ABSTRACT

An electrochemical pouch cell includes a pouch cell housing and an electrode assembly disposed in the housing. The housing is formed of a single blank that is progressively drawn to form first and second recesses in the sheet, where the first recess coincides with a portion of the second recess. The blank is then folded so that the recesses are aligned and open facing each other. The electrode assembly is disposed in the space defined within and between the recesses, and flange portions of the material surrounding the recesses are sealed together to form a sealed electrochemical cell in which one side of the cell is free of the flange. The progressive drawing process along with the configuration of the recesses allows the cell housing to have an increased depth relative to some conventional pouch cell housings.

14 Claims, 10 Drawing Sheets

(56) References Cited

U.S. PATENT DOCUMENTS

| | | | |
|---|---|---|---|
| 2011/0287308 A1 | 11/2011 | Kim et al. | |
| 2012/0177953 A1 | 7/2012 | Bhardwaj et al. | |
| 2012/0219847 A1* | 8/2012 | Hong | H01M 2/0217 429/163 |
| 2013/0101894 A1 | 4/2013 | Baba | |
| 2013/0149597 A1* | 6/2013 | Suzuta | B32B 27/36 429/175 |
| 2014/0308577 A1 | 10/2014 | Kim et al. | |
| 2016/0093837 A1 | 3/2016 | Bushnell et al. | |
| 2016/0181667 A1* | 6/2016 | Kim | H01M 2/0217 205/59 |
| 2016/0380245 A1* | 12/2016 | Kang | H01M 2/0275 429/185 |
| 2018/0219245 A1* | 8/2018 | Choi | H01M 10/045 |

FOREIGN PATENT DOCUMENTS

| | | |
|---|---|---|
| WO | 2007119950 | 10/2007 |
| WO | 2018186637 | 10/2018 |
| WO | 2019121332 | 6/2019 |

\* cited by examiner

DEEP POUCH CELL AND METHOD OF MANUFACTURING SAME

BACKGROUND

Lithium-ion battery cells are provided in various cell types that address the space requirements of a very wide variety of installation situations, and the most common types used in automobiles are cylindrical cells, prismatic cells, and pouch cells. The cells of different types each have substantially the same internal construction, including an electrode assembly having a positive electrode, a negative electrode, and a separator membrane that separates the positive electrode from the negative electrode. In addition to the electrode assembly, cells may also include an electrolyte/solvent, but they can differ appreciably in terms of their general dimensions, cell housing, and volumetric energy efficiency.

With respect to the cell housing, for example, the cylindrical cells and prismatic cells each typically have a rigid housing, usually made of metal or plastic, whereas the pouch cell has a housing that is formed of a flexible outer envelope made of a metal foil laminate material that seals off the actual battery space from the environment. Pouch cell housings may be formed using a single-draw drawing process that produces tray-like case halves that are subsequently sealed together. However, the maximum draw depth of the metal laminated film used to form the pouch cell is limited by the material properties of the metal layer of the metal foil laminate material. For example, some aluminum metal foil laminate materials have a maximum draw depth of about 6 mm to 8 mm, and drawing to greater depths can result in tearing of the aluminum layer in the corners of the case half due to material overstress and stretching in this region. The forming process including the drawing step thus limits the overall depth of the pouch cell that can be formed to about 12 mm to 16 mm. For example, a cell depth d(c) of 16 mm is obtained by sandwiching the electrode assembly between two drawn films, where the cell depth d(c) is the dimension of the cell in the draw direction. This depth limit, which is typically less than twice the draw depth of the metal foil laminate material, in turn limits the amount of active material that can be stored within the pouch cell, noting that the amount of active material is related to the size of the electrode assembly. Such conventional pouch cells having drawn cell housings are typically used to enclose a stack of thin electrode plates having a large area (e.g., length and width dimensions) to achieve acceptable energy outputs. That is, the aspect ratio of cell depth d(c) to length l(c) or width w(c) is very small (for example, less than 0.1). In order to form battery pouch cells having a greater power storage capacity, it is desirable to form pouch cells having a greater overall cell depth d(c).

SUMMARY

In some aspects, an electrochemical cell includes a pouch cell housing and an electrode assembly disposed in the housing. The electrode assembly includes a positive electrode, a negative electrode and a separator disposed between the positive electrode and the negative electrode. The positive electrode, the separator and the negative electrode are stacked along a stack axis. The electrode assembly further includes a first major side that is perpendicular to the stack axis, a second major side that is parallel to the first major side, and a first minor side that is parallel to the stack axis and extends between the first major side and the second major side. The housing includes a single sheet of a metal foil laminate material. The sheet includes a first sheet surface, a second sheet surface that is opposed to the first sheet surface, and a sheet peripheral edge that extends between the first sheet surface and the second sheet surface. A first recess is formed in the first sheet surface. The first recess includes a pair of parallel first recess first sides, a pair of parallel first recess second sides that are perpendicular to the first recess first sides, and a first recess endwall, where the first recess first sides and the first recess second sides adjoin the first recess endwall and cooperate to surround the first recess endwall. In addition, a second recess is formed in the first sheet surface in a region of the sheet that includes the first recess. The second recess includes a pair of parallel second recess first sides, a pair of parallel second recess second sides that are perpendicular to the second recess first sides, and a second recess endwall, where the second recess first sides and the second recess second sides adjoin the second recess endwall and cooperate to surround the second recess endwall. Prior to folding the sheet to form an enclosure that receives the electrode assembly, the sheet has the following configuration: The sheet peripheral edge resides in a plane. The second recess endwall is offset relative to the plane. The first recess endwall is offset relative to the plane such that the second recess endwall is disposed between the first recess endwall and the plane along an axis that is perpendicular to the plane. The first recess first sides are parallel to the second recess first sides. The first recess second sides are parallel to the second recess second sides. The first recess first sides are coplanar with the second recess first sides, and the second recess second sides are disposed between the sheet peripheral edge and the first recess second sides along an axis that is parallel to the plane. In this configuration, a first portion of the second recess is provided between the second recess second side and the first recess second side on one side of the first recess, and a second portion of the second recess is provided between the second recess second side and the first recess second side on an opposed side of the first recess. Following folding the sheet to form the enclosure that receives the electrode assembly, the sheet has the following configuration: The electrode assembly is disposed in the enclosure such that the first minor side is disposed in the first recess. The first major side is disposed in the first portion of the second recess. The second major side is disposed in the second portion of the second recess, and a first region of the sheet that is disposed between the first portion of the second recess and the sheet peripheral edge is bonded to a second region of the sheet that is disposed between the second portion of the second recess and the sheet peripheral edge.

In some embodiments, the ratio (A)/(B) is 2, where (A) is a distance between the respective second surfaces of the first recess, and (B) is a distance between the second recess endwall and the plane.

In some embodiments, following folding the sheet to form the enclosure that receives the electrode assembly, the first region and the second region as bonded together form a flange that protrudes outward along three sides of the cell housing so as to overlie a second minor side of the electrode assembly, a third minor side of the electrode assembly, and a fourth minor side of the electrode assembly. A fourth side of the cell housing that overlies the first minor side of the electrode assembly is free of the flange.

In some embodiments, the first and second recesses each have the shape of a rectangular prism.

In some embodiments, the pouch cell housing has a dimension in a direction parallel to the stack axis that is greater than twice the draw depth of the material used to form the pouch cell housing.

In some embodiments, the metal foil laminate material comprises an aluminum foil layer that is sandwiched between polymer layers.

In some aspects, a method of forming an electrochemical cell having a pouch cell housing includes the following method steps:

The method includes the step of providing a sheet of a metal foil laminate material, the sheet including a first sheet surface that resides in a plane, a second sheet surface that is opposed to the first sheet surface, and a sheet peripheral edge that extends between the first sheet surface and the second sheet surface.

The method includes the step of providing an electrode assembly. The electrode assembly includes a positive electrode, a negative electrode and a separator disposed between the positive electrode and the negative electrode. The positive electrode, the separator and the negative electrode are stacked along a stack axis, and the electrode assembly further comprises a first major side that is perpendicular to the stack axis, a second major side that is parallel to the first major side, and a first minor side that is parallel to the stack axis and extends between the first major side and the second major side.

The method includes the step of forming a first recess in the first sheet surface at a first location. The first recess includes a pair of parallel first recess first sides, a pair of parallel first recess second sides that are perpendicular to the first recess first sides, and a first recess endwall that is offset from, and parallel to, the plane. The first recess first sides and the first recess second sides adjoin the first recess endwall and cooperate to surround the first recess endwall, and the first recess first sides and the first recess second sides are each spaced apart from the sheet peripheral edge.

The method includes the step of forming a second recess in the first sheet surface at the first location. The second recess includes a pair of parallel second recess first sides, a pair of parallel second recess second sides that are perpendicular to the second recess first sides, and a second recess endwall that is offset from, and parallel to, the plane and the first recess endwall. The second recess first sides and the second recess second sides adjoin the second recess endwall and cooperate to surround the second recess endwall. The second recess first sides and the second recess second sides are each spaced apart from the sheet peripheral edge. The second recess endwall is disposed between the first recess endwall and the plane along an axis that is perpendicular to the plane. The first recess first sides are parallel to, and coplanar with, the second recess first sides. The first recess second sides are parallel to the second recess second sides. In addition, the second recess second sides are disposed between the sheet peripheral edge and the first recess second sides along an axis that is parallel to the plane. As a result, a first portion of the second recess is provided between the second recess second side and the first recess second side on one side of the first recess, and a second portion of the second recess is provided between the second recess second side and the first recess second side on another side of the first recess.

The method includes the step of placing the electrode assembly in the first recess such that the first minor side faces the first recess endwall.

The method includes the step of folding the sheet in a first direction along a first fold line until the first portion of the second recess faces the first major side, where the first fold line is defined by an intersection of one of the first recess second sides of the pair of first recess second sides and the second endwall within the first portion of the second recess, The method includes the step of folding the sheet in a second direction along a second fold line until the second portion of the second recess faces the second major side, where the second fold line is defined by an intersection of another of the first recess second sides of the pair of first recess second sides and the second endwall within the second portion of the second recess, and the second direction is opposed to the first direction.

The method includes the step of joining a first flange portion to a second flange portion along a seal line so as to provide a sealed space within the cell in which the electrode assembly is disposed, where the first flange portion comprises a first border region of the sheet that is disposed between the first portion of the second recess and the sheet peripheral edge, and the second flange portion comprises a second border region of the sheet that is disposed between the second portion of the second recess and the sheet peripheral edge.

In some embodiments, the method includes the steps of forming a first pleat in the first and second flange portions at a location corresponding to one of the first recess first sides of the pair of first recess first sides, and forming a second pleat in the first and second flange portions at a location corresponding to another one of the first recess first sides of the pair of first recess first sides.

In some embodiments, the seal line extends across both first pleat and the second pleat.

In some embodiments, the ratio (A)/(B) is 2, where (A) is a distance between the respective second sides of the first recess, and (B) is a distance between the second recess endwall and the plane.

In some embodiments, following the step of joining a first flange portion to the second flange portion, the first region and the second region, as joined together, form a flange that protrudes outward along three sides of the cell housing so as to overlie a second minor side of the electrode assembly, a third minor side of the electrode assembly and a fourth minor side of the electrode assembly, and a fourth side of the cell housing that overlies the first minor side of the electrode assembly is free of the flange.

In some embodiments, the first recess is formed in the sheet before the second recess is formed in the sheet.

In some embodiments, the metal foil laminate material comprises an aluminum foil layer that is sandwiched between polymer layers.

In some embodiments, the step of forming the second recess includes forming edges that are defined by the intersection of the second recess first sides with the corresponding one of the first border region and the second border region, and providing a discontinuity in the edges at a location that coincides with the first recess first sides.

In some aspects, a method of forming a pouch cell housing for an electrochemical cell includes the following method steps:

The method includes the step of providing a sheet of a metal foil laminate material, the sheet including a first sheet surface that resides in a plane, a second sheet surface that is opposed to the first sheet surface, and a sheet peripheral edge that extends between the first sheet surface and the second sheet surface.

The method includes the step of drawing a first recess in the first sheet surface at a first location that is spaced apart from the sheet peripheral edge;

The method includes the step of, following drawing the first recess, drawing a second recess in the first sheet surface at the first location. The second recess is drawn in such a way that the first recess and the second recess are drawn in the same drawing direction. The second recess is larger than the first recess whereby a first portion of the second recess is disposed between the first recess and the sheet peripheral edge on one side of the first recess, and a second portion of the second recess is disposed between the first recess and the sheet peripheral edge on an opposed side of the first recess. A portion of a sidewall of the second recess is coplanar with a portion of a sidewall of the first recess, an endwall of the second recess is offset from the plane, and the endwall of the second recess is offset from an endwall of the first recess.

In some embodiments, a distance between the first portion of the second recess and the second portion of the second recess is twice the depth of the second recess, where the depth of the second recess corresponds to a dimension of the second recess in a direction parallel to the drawing direction.

In some embodiments, the method includes the steps of folding the sheet so that an opening of the first portion of the second recess and faces an opening of the second portion of the second recess.

In some embodiments, the step of drawing a second recess includes forming an edge in the second recess that includes a discontinuity, and following the step of folding the sheet, the method further includes forming a pleat in the sheet at a portion of the sheet that includes the discontinuity.

In some aspects, an electrochemical cell includes a pouch cell housing and an electrode assembly disposed in the housing. The electrode assembly includes a positive electrode, a negative electrode and a separator disposed between the positive electrode and the negative electrode. The positive electrode, the separator and the negative electrode are stacked along a stack axis. The electrode assembly has the form of a rectangular prism, and includes a pair of major sides that are perpendicular to the stack axis. The major sides have an area defined by the length and width dimensions of the electrode assembly, where the length and width are much greater than a depth of the electrode assembly. The housing provides a sealed interior space that receives the electrode assembly along with an electrolyte. The housing includes a single sheet of a metal foil laminate material that subjected to a series of forming steps to provide the interior space. The sheet includes a first sheet surface, a second sheet surface that is opposed to the first sheet surface, and a sheet peripheral edge that extends between the first sheet surface and the second sheet surface.

In some of the forming steps, a first recess and a second recess are provided in the sheet or blank of metal foil laminate material used to form the cell housing. Both the first recess and the second recess are formed in a progressive manner, and the first recess is coincident with a portion of the second recess. The second recess is sized to receive therein three portions of the electrode assembly: A first portion that includes to a minor side of the electrode assembly, a second portion that includes one major side of the electrode assembly, and a third portion that includes the other major side of the electrode assembly. Thus, the sheet used to form the second recess is large relative to a sheet used to form a conventional pouch cell housing, where a recess may be sized to accommodate one major side of the electrode assembly. Since the draw depth of the metal foil laminate material is greater for a sheet of a greater size, the pouch cell formed of a single sheet that is sized to accommodate a relatively large recess may have a greater draw depth than a pouch cell that is formed of a sheet that is sized to accommodate a smaller, conventionally-sized recess. In addition, due to the relatively large area required to accommodate the second recess, the draw depth of the second recess can be made greater than a draw depth for a recess having a relatively smaller area, such as is used to form some conventional pouch cell housings. Since the sheet can be drawn to a greater draw depth, the depth D of the cell housing is increased relative to some conventional pouch cells.

In addition to having a cell housing depth d(c) that is greater than some conventional pouch cells formed of the same material, the pouch cell housing described herein has a side that is free of pouch flanges and a corresponding seal line. The flange-free side of the housing provides a flat surface that can allow good thermal contact with a cell thermal management device such as a cooling plate, whereby the temperature of the cell can be efficiently and easily controlled. Moreover, since the flange-free side of the cell housing corresponds to a side of the housing that provides cell housing depth, the area corresponding to the flange-free side that contacts the cooling plate is large relative to a pouch cell having a conventional depth, further increasing the efficiency of the thermal management of the cell.

DETAILED DESCRIPTION

Figure 1:
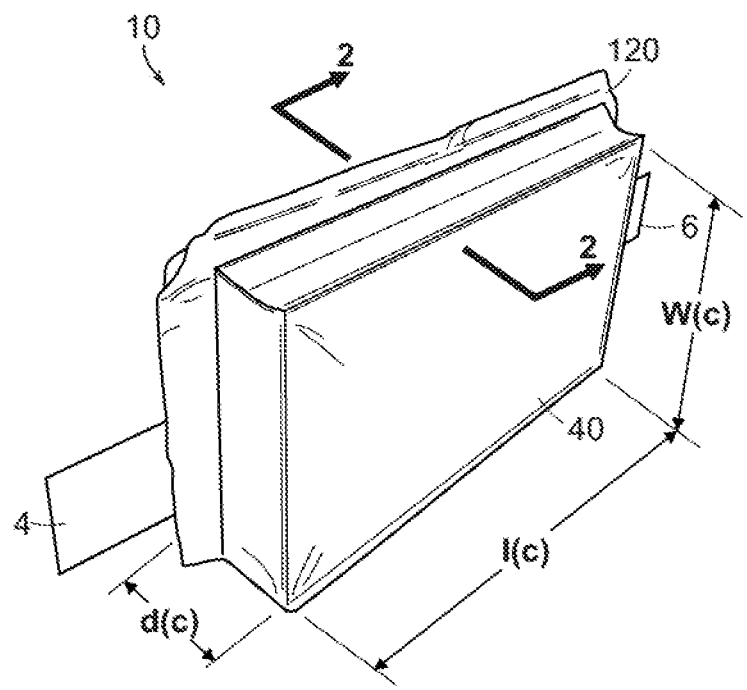
FIG. 1 is a perspective view of a pouch cell.
Figure 2:
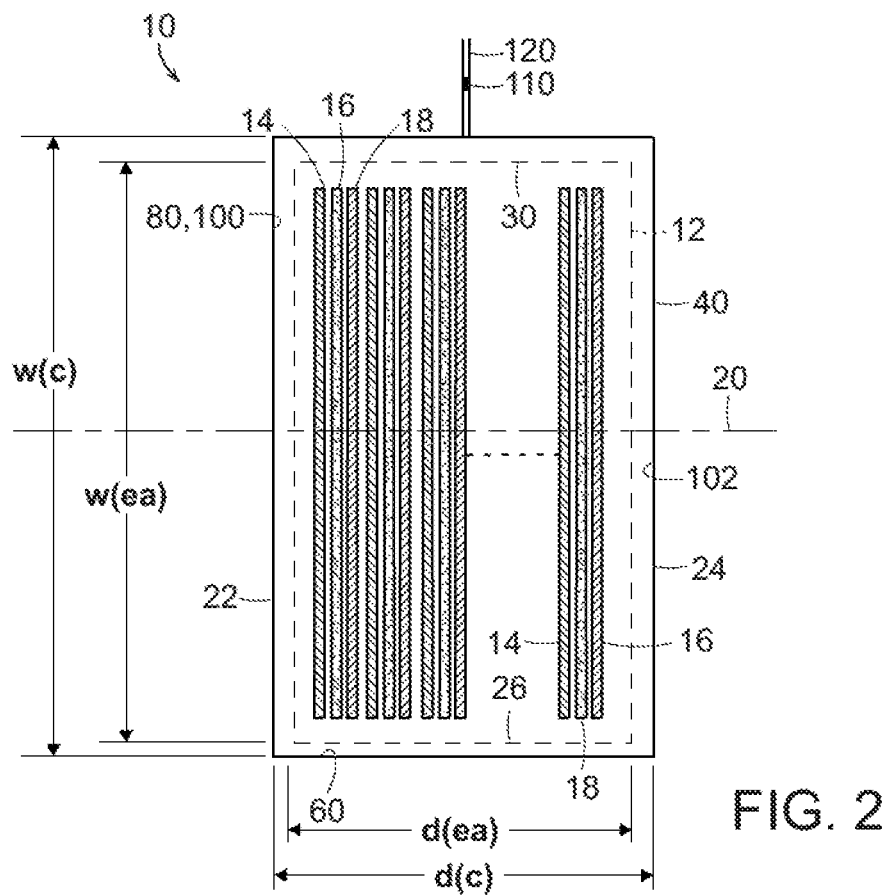
FIG. 2 is cross-sectional view of the pouch cell of FIG. 1 as seen along line 2-2.

Referring to FIGS. 1 and 2, a lithium ion electrochemical pouch cell 10 includes a pouch-type housing 40 and an electrode assembly 12 that is sealed within the housing 40 along with an electrolyte. The pouch cell 10 includes a positive terminal 4 and a negative terminal 6 that protrude out of the housing 40. The positive and negative terminals 4, 6 are electrically connected to the electrode assembly 12 and provide contacts by which electrical power can be transferred to and from the cell 10. The housing 40 is formed of a single sheet (e.g., a blank) 42 of a flexible metal foil laminate material. In a method described in detail below, the sheet 42 is drawn progressively in such a way that a first recess 60 is formed in the sheet, and then a second recess 80 is formed in the sheet 42 in a region that includes the first recess 60. The second recess 80 includes first and second portions 100, 102 that are disposed on opposed sides of the first recess 60 and are spaced apart a distance corresponding to a width of the first recess 60. The electrode assembly 12 is positioned in the first recess 60, and then the twice-drawn sheet 42 is folded so that the first and second portions 100, 102 of the second recess 80 are aligned and open facing each other, and the electrode assembly 12 is received in the space defined within and between the first and second portions 100, 102 of the second recess 80. In addition, flange portions X, Y corresponding to the sheet material surrounding the first and second recesses 60, 80 are sealed together to form the sealed electrochemical cell 10. The outward-facing surface of the first recess 60, which receives a side of the electrode assembly 12, provides a planar, flange-free side of the pouch cell 10. Since the pouch cell 10 has a side that is flange-free, thermal management of the pouch cell 10 via the flange-free side can be accomplished efficiently, effectively and reliably.

Referring to FIG. 2, the electrode assembly 12 comprises at least one positive electrode 14, at least one negative electrode 16 and a separator 18 that is disposed between each pair of the positive electrode 14 and the negative electrode 16. Each of the positive electrodes 14, the negative electrodes 16 and the separators 18 are thin plates, and each of the positive and negative electrodes 14, 16 have a layered structure to facilitate insertion and/or movement of lithium ions. For example, the positive electrodes 14 may include a first substrate formed of a first electrically-conductive material such as copper, and a first active material such as a graphite coating that is disposed on one or both sides of the first substrate. In addition, negative electrodes 16 may include a second substrate formed of a second electrically-conductive material such as aluminium, and a second active material such as a lithiated metal oxide coating that is disposed on one or both sides of the second substrate. The substrates used to form the positive and negative electrodes 14, 16 are very thin (e.g., having a thickness or depth on the order of about 0.04 mm to 0.15 mm) compared to the overall cell depth d(c) (e.g. having a depth of about 36 mm) and thus are illustrated schematically and not to scale in the figures.

The separator 18 is a permeable membrane that functions to keep the positive and negative electrodes 14, 16 apart to prevent electrical short circuits while also allowing passage of ionic charge carriers provided in the electrolyte and that are needed to close the circuit during the passage of current within the cell 10. The separator 18 is formed of an electrically insulating material such as a tri-layer polypropylene-polyethylene-polypropylene membrane.

The positive electrodes 14 and negative electrodes 16 are arranged in a stacked or layered configuration in which a separator 18 is disposed (e.g., sandwiched) between each pair of the positive and negative electrodes 14, 16. A stack axis 20 of the electrode assembly 12 extends through a center of the electrode assembly 12 in a direction parallel to the stacking direction. In the stacked configuration, the positive electrodes 14, the negative electrodes 16 and separators 18 are stacked along the stack axis 20. In some embodiments, the peripheral edges of each of the electrodes 14, 16 and separators 18 are aligned in a direction parallel to the direction of the stack axis 20, while in other embodiments, the peripheral edges of the positive electrodes 14 are offset to one side of the stack axis 20, while the peripheral edges of the negative electrodes 16 are offset to an opposed side of the stack axis 20. The particular alignment of the peripheral edges facilitates connection of the electrodes 14, 16 to respective positive and negative terminals 4, 6 of the cell 10, and is determined based on whether current collectors (not shown) are used, and the type of current collector used.

The electrode assembly 12 has the shape of a rectangular prism in which the length l(ea) and width w(ea) dimensions are much greater than the depth d(ea). The electrode assembly 12 has a first major side 22 that is perpendicular to the stack axis 20, and a second major side 24 that is parallel to the first major side 22, and spaced apart from the first major side 22 a distance corresponding to the electrode assembly depth d(ea). The first and second major sides have dimensions corresponding to the length l(ea) and width w(ea) dimensions of the electrode assembly 12. The electrode assembly 12 includes four minor sides that extend between the first and second major sides 22, 24. The first and third minor sides 26, 30 are shown in FIG. 2. The minor sides are parallel to the stack axis 20 and extend between the first major side 22 and the second major side 24. In the illustrated embodiment, the first and third minor sides 26, 30 have dimensions corresponding to the length l(ea) and depth d(ea) dimensions of the electrode assembly 12. The electrode assembly 12 is sealed within the housing 40 along with a liquid electrolyte. Other ancillary components such as current collectors, sensors, etc. may also be sealed within the housing 40 as required by the specific application.

Referring to FIGS. 3-13, a method of manufacturing an electrochemical cell 10 having a pouch-type housing 40 that is formed from a single blank or sheet 42 of housing material will now be described.

Figure 3:
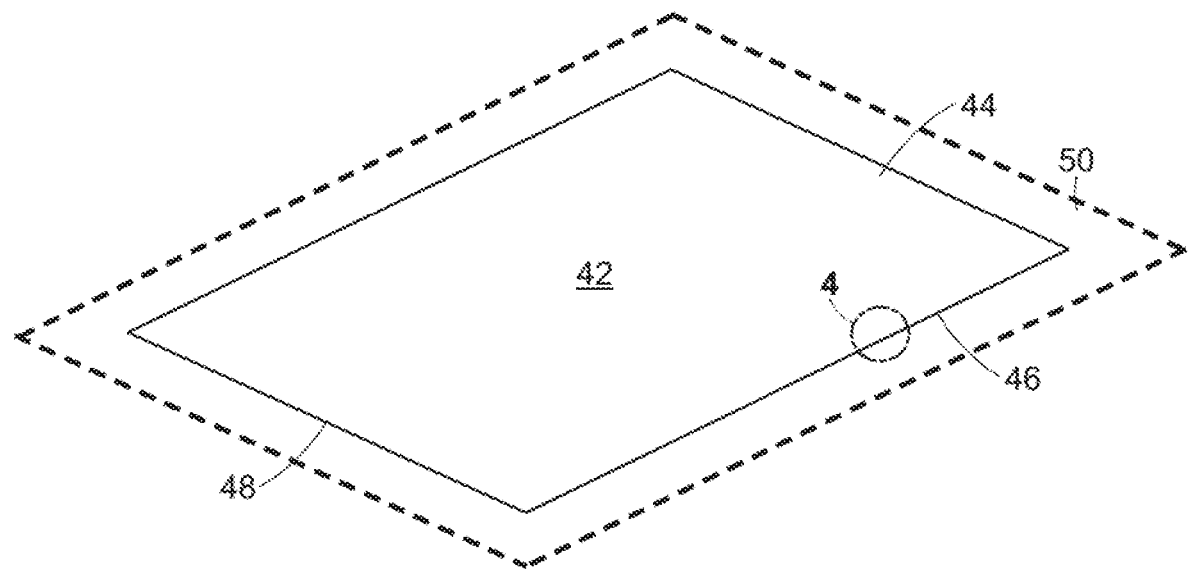
FIG. 3 is a perspective view of a sheet used to form the pouch cell housing.
Figure 4:
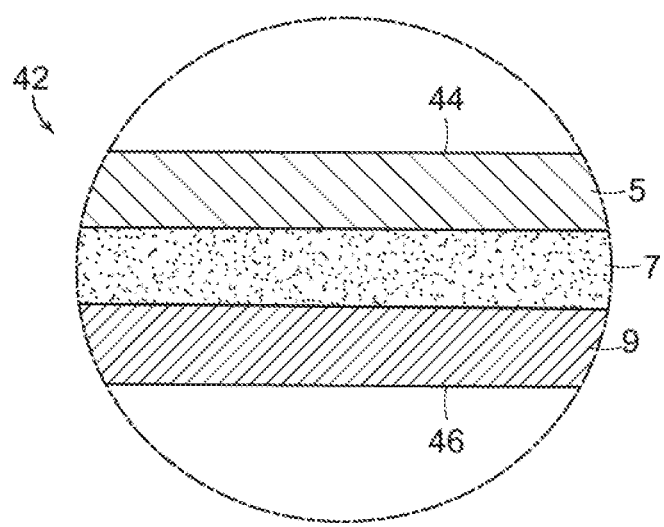
FIG. 4 is a detail view of a portion of FIG. 3 as indicated by the broken circle in FIG. 3.

In an initial step (step 200), a sheet 42 of a metal foil laminate material is provided that will be mechanically formed and folded to form the cell housing 40. In the illustrated embodiment, the material is a flexible, three-layer, metal laminated film that includes a central layer of an aluminium foil 7 that is sandwiched between a layer of polyamide 5 and a layer of polypropylene 9 (FIGS. 3, 4). The sheet 42 includes a first sheet surface 44 corresponding to an outer surface of the polyamide layer 5, and a second sheet surface 46 corresponding to an outer surface of the polypropylene layer 9 and that is opposed to the first sheet surface 44. In addition, the sheet 42 includes a sheet peripheral edge 48 that extends between the first sheet surface 44 and the second sheet surface 46. Prior to any forming steps, the sheet 42 is flat or planar, and in this configuration, the first sheet surface 44 defines a plane 50 (FIG. 3) that will be used as a reference plane in following description.

Figure 5:
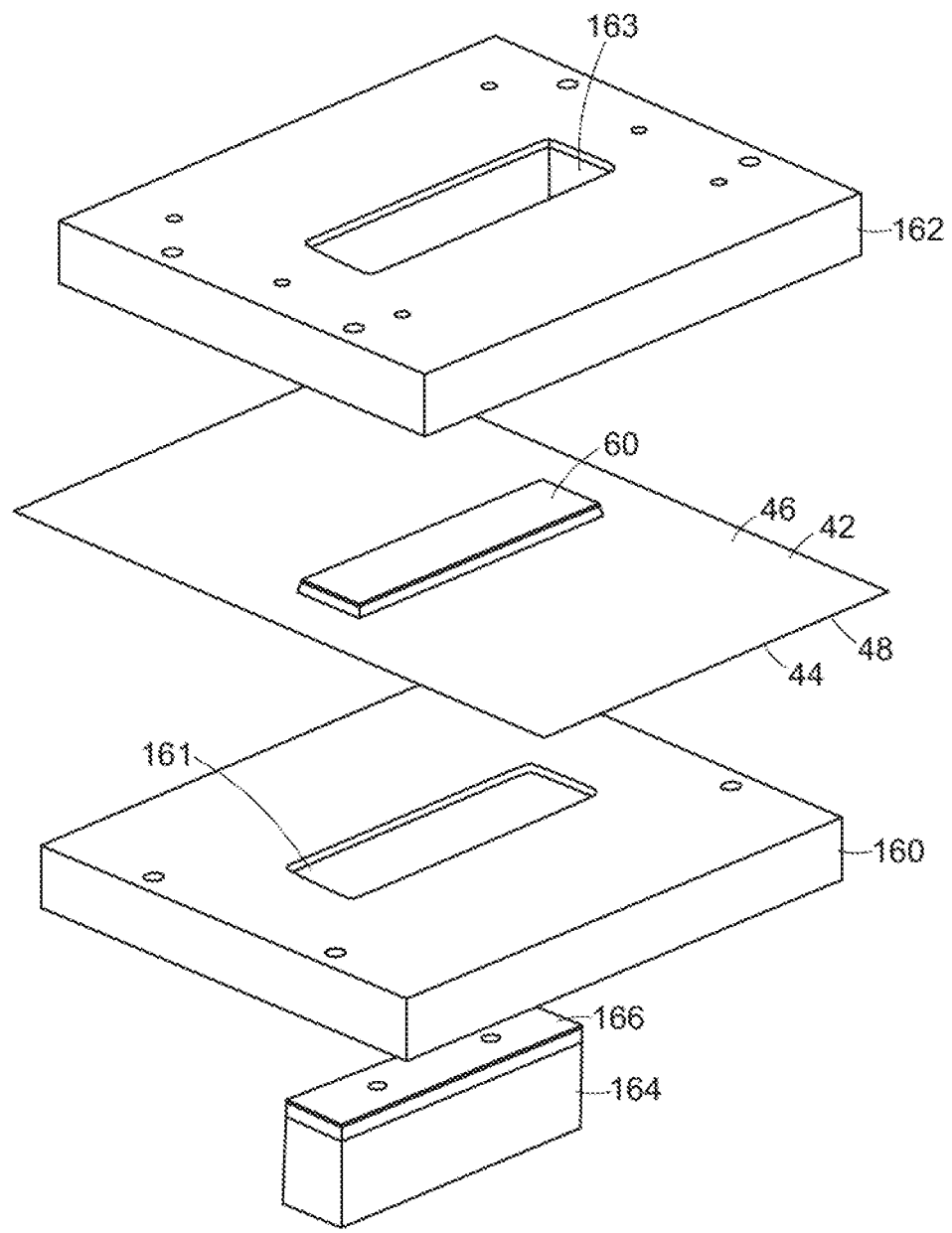
FIG. 5 is an exploded perspective view of the sheet of FIG. 3 shown with respect to mold elements used to form the first recess.
Figure 6:
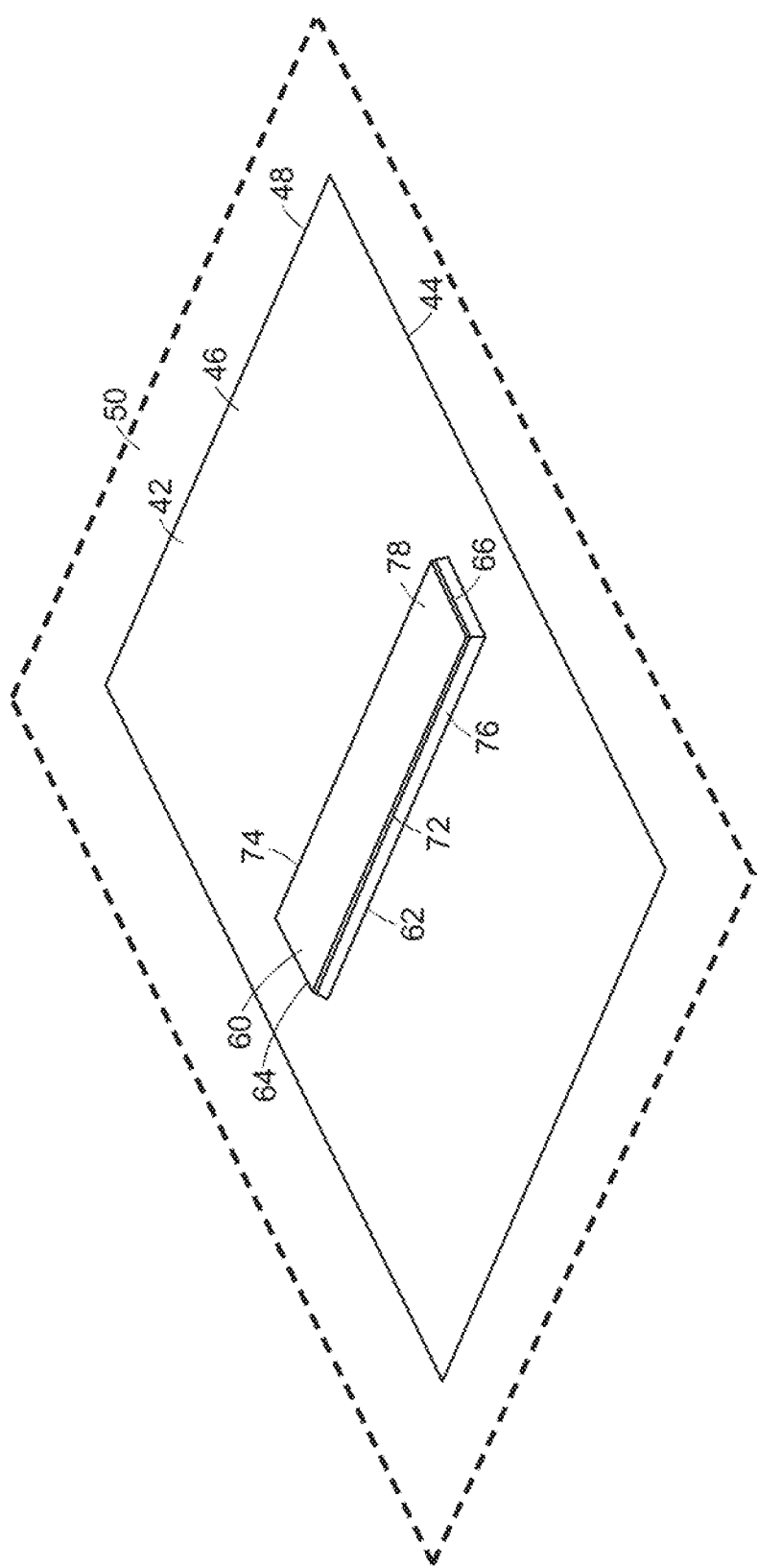
FIG. 6 is a perspective view of the sheet of FIG. 3 following a first drawing step.

Referring to FIGS. 5 and 6, the first recess 60 is formed in the first sheet surface 44 of the sheet 42 at a location that is spaced apart from the sheet peripheral edge 48 (step 202). The first recess 60 is shaped and dimensioned to receive a first portion 34 of the electrode assembly 12, where the first portion 34 includes, for example, the first minor side 26 of the electrode assembly 12. In the illustrated embodiment, the first recess 60 is a rectangular prism to correspond to the rectangular shape of the end of the electrode assembly 12 including the first minor side 26. The first recess 60 includes a first recess sidewall 76 that surrounds a first recess endwall 78. The first recess endwall 78 is offset relative to the plane 50. The first recess sidewall 76 includes a pair of parallel first recess first sides 64, 66, and a pair of parallel first recess second sides 72, 74 that are perpendicular to the first recess first sides 64, 66. In the illustrated embodiment, the first recess sidewall 76, including the first recess first sides 64, 66 and the first recess second sides 72, 74 are arranged to form a rectangular closed section, but it is understood that the first recess sidewall 76 can have other shapes, including non-rectangular polygons and or curved shapes, as required by the application, and particularly by the shape of the first portion 34 of the electrode assembly 12.

The first recess 60 may be formed in the sheet 42 via a first drawing step, for example using a first punch tool 164 to deform the sheet 42 while it is secured between a first clamp tool 160 and a first forming tool 162. The forming portion 166 of the first punch tool 164 has the shape of a rectangular prism to correspond to the rectangular shape of the end of the electrode assembly 12 that includes the first minor side 26. During the first drawing step, the first punch tool 164 is advanced through rectangular openings 161, 163 provided in the first clamp tool 160 and the first forming tool 162.

Figure 7:
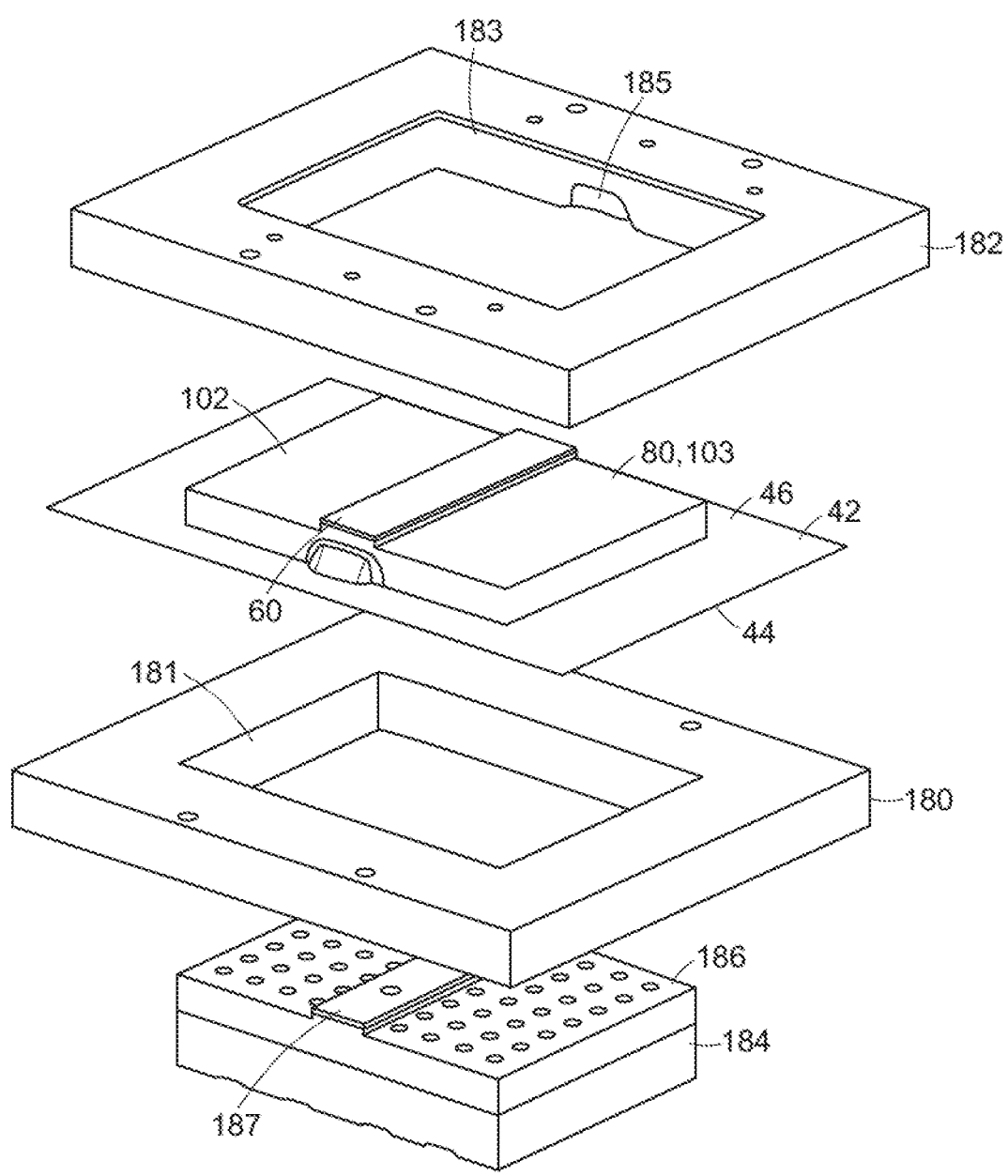
FIG. 7 is an exploded perspective view of the sheet of FIG. 6 shown with respect to mold elements used to form the second recess.
Figure 8:
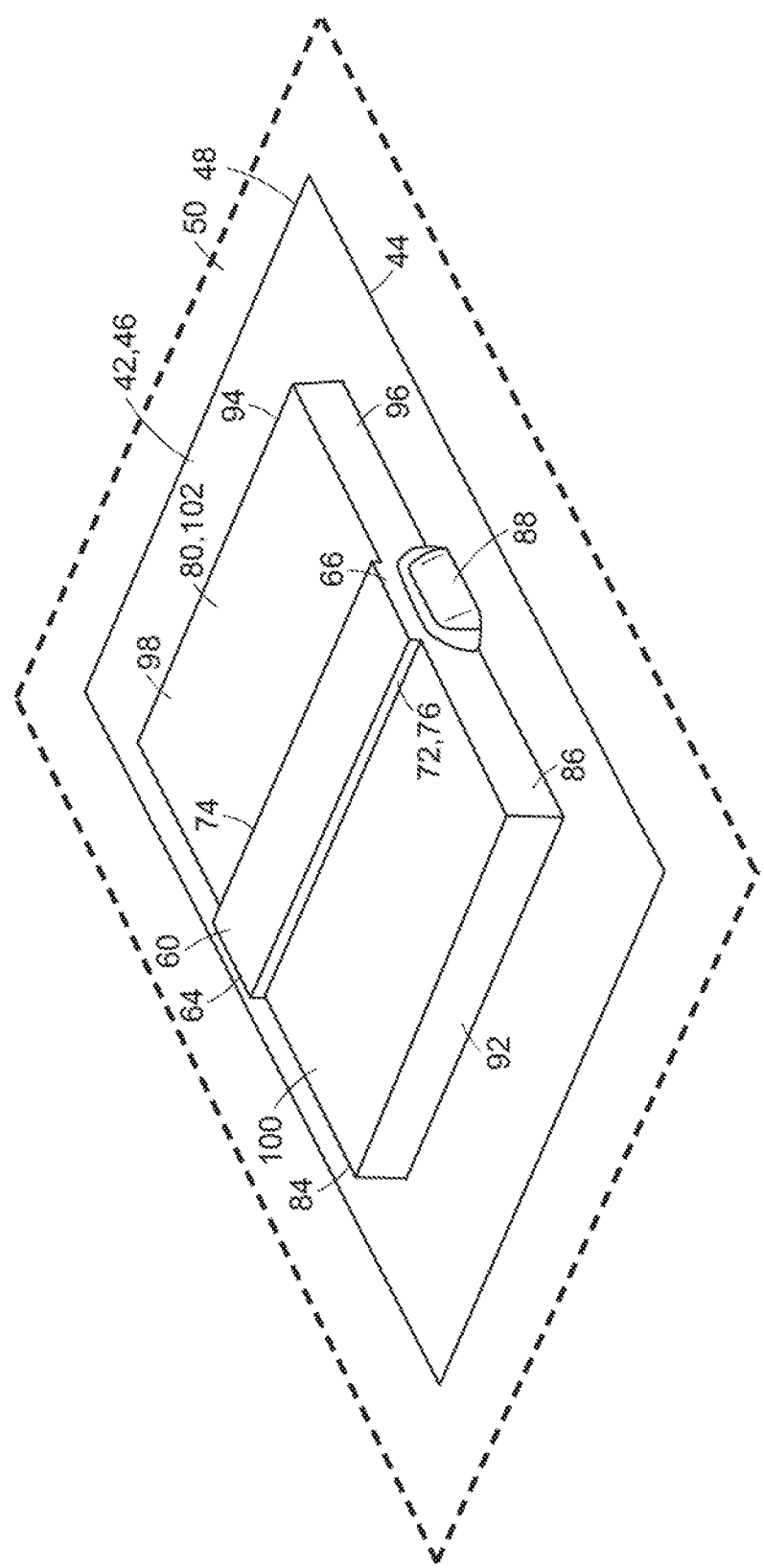
FIG. 8 is a perspective view of the sheet of FIG. 6 following a second drawing step.

Referring to FIGS. 7 and 8, following formation of the first recess 60 in the sheet 42, the second recess 80 is formed in the first sheet surface 44 (step 204). The second recess 80 is located so as to be spaced apart from the sheet peripheral edge 48 and in a region of the sheet 42 that includes the first recess 60.

The second recess 80 is shaped and dimensioned to receive second and third portions 36, 38 of the electrode assembly 12, where, for example, the second portion 36 includes the first major side 22 of the electrode assembly 12 and the third portion 38 includes the second major side 34 of the electrode assembly 12. In the illustrated embodiment, the second recess 80 is a rectangular prism to correspond to the rectangular shape of the major sides 22, 24 of the electrode assembly 12. In addition, the second recess 80 is larger than the first recess 60 so as to accommodate the first and second major sides 22, 24 of the electrode assembly 12.

The second recess 80 includes a second recess sidewall 96 that surrounds a second recess endwall 98. At this step of the forming process, the second recess endwall 98 is parallel to the first recess endwall 78. In addition, the second recess endwall 98 is offset relative to both the plane 50 and the first recess endwall 78. In particular, the second recess endwall 98 is disposed between the plane 50 and the first recess endwall 78 along an axis that is perpendicular to the plane 50. The second recess sidewall 96 includes a pair of parallel second recess first sides 84, 86, a pair of parallel second recess second sides 92, 94 that are perpendicular to the second recess first sides 84, 86. In the illustrated embodiment, the second recess sidewall 96, including the second recess first sides 84, 86 and the second recess second sides 92, 94 are arranged to form a rectangular closed section, but it is understood that the second recess sidewall 96 can have other shapes, including non-rectangular polygons and or curved shapes, as required by the application.

The second recess 80 may be formed in the sheet 42 via a second drawing step, for example using a second punch tool 184 to deform the sheet 42 while it is secured between a second clamp tool 180 and a second forming tool 182. The forming portion 186 of the second punch tool 184 has the shape of a rectangular prism to correspond to the rectangular shape of the sides of the electrode assembly 12 including the major sides 22, 24. The forming portion 186 may include a protrusion 187 having the shape and dimensions of the first recess 60. The protrusion 187 is received in the first recess 60 during the second drawing step in order to support the first recess 60 during this step. During the second drawing step, the second punch tool 184 is advanced through openings 181, 183 provided in the second clamp tool 180 and the second forming tool 182. The leading edge of the opening 183 in the second forming tool 182 is generally rectangular in shape, except the leading edge has a pair of tool edge discontinuities or cut outs 185. In FIG. 8, only one tool edge discontinuity 185 is visible. By providing the tool edge discontinuities 185 in the second forming tool 182, each of the first sides 84, 86 of the second recess 80 are formed having corresponding sheet edge discontinuities 88 (only one is shown). The sheet edge discontinuities 88 are provided in the edge defined at the intersection of the first sides 84, 86 of the second recess 80 and the plane 50, at a location midway between the second recess second sides 92, 94 (e.g., at a location corresponding to the first recess 60). The sheet edge discontinuities 88 facilitate pleating of the sheet 42 in subsequent steps, as discussed below.

Thus, the first and second recesses 60, 80 are formed in the sheet 42 via, for example, a progressive drawing process, in which the first recess 60 is formed in the sheet 42 and subsequent to forming the first recess 60, the second recess 80 is formed in the sheet 42. The cumulative effect of the progressive forming process is a deformed sheet 42 having a stepped depression formed in the first sheet surface 44 when the sheet 42 is seen facing the first sheet surface 44 (not shown), and a corresponding stepped protrusion formed in the second sheet surface 46 when the sheet 42 is seen facing the second sheet surface 46 (FIG. 7).

In the progressive drawing process, the first and second recesses 60, 80 are dimensioned and located so that the first recess first sides 64, 66 are parallel to the second recess first sides 84, 86 and are coplanar with the second recess first sides 84, 86. In addition, the first recess second sides 72, 74 are parallel to the second recess second sides 92, 94 and spaced apart from the second recess second sides 92, 94. In particular, the second recess second sides 92, 94 reside between the first recess second sides 72, 74 and the sheet peripheral edge 48 along an axis that is parallel to the plane 50. More particularly, the first recess 60 is disposed mid way between the second recess second sides 92, 94. By this configuration, the second recess 80 encompasses the first recess 60. In addition, the second recess 80 includes the portions 100, 102 that are disposed on opposed sides of the first recess 60. That is, the first portion 100 of the second recess 80 is provided between the second recess second side 92 and the first recess second side 72 on one side of the first recess 60. In addition, the second portion 102 of the second recess 80 is provided between the second recess second side 94 and the first recess second side 74 on an opposed side of the first recess 60.

The first portion 100 of the second recess 80 is shaped and dimensioned to receive the second portion 36 of the electrode assembly 12 that includes the first major side 22. Similarly, the second portion 102 of the second recess 80 is shaped and dimensioned to receive the third portion 38 of the electrode assembly 12 that includes the second major side 24. In addition, the distance A between the respective second sides 72, 74 of the first recess 60 is set relative to the distance B between the second recess endwall 98 and the plane 50 so that the ratio (A)/(B) is 2/1.

The sheet 42 includes a first border region 52 that is disposed between the first portion 100 of the second recess 80 and the sheet peripheral edge 48. In addition, the sheet 42 includes a second border region 54 that is disposed between the second portion 102 of the second recess 80 and the sheet peripheral edge 48. Following formation of the first and second recesses 60, 80, and before any subsequent method steps, the first border region 52 and the second border region 54 including the sheet peripheral edge 48 remain within the plane 50.

Following formation of the first and second recesses 60, 80, the sheet 42 is folded. In particular, the sheet 42 is folded in a first direction along a first fold line 112 (step 206, FIG. 9). The first fold line 112 overlies or coincides with a corner defined by the intersection between one of the first recess second sides 72 and the second recess endwall 98 within the first portion 100 of the second recess 80. The sheet 42 is folded along the first fold line 112 until the first portion 100 of the second recess 80 is generally perpendicular to the plane 50.

Figure 9:
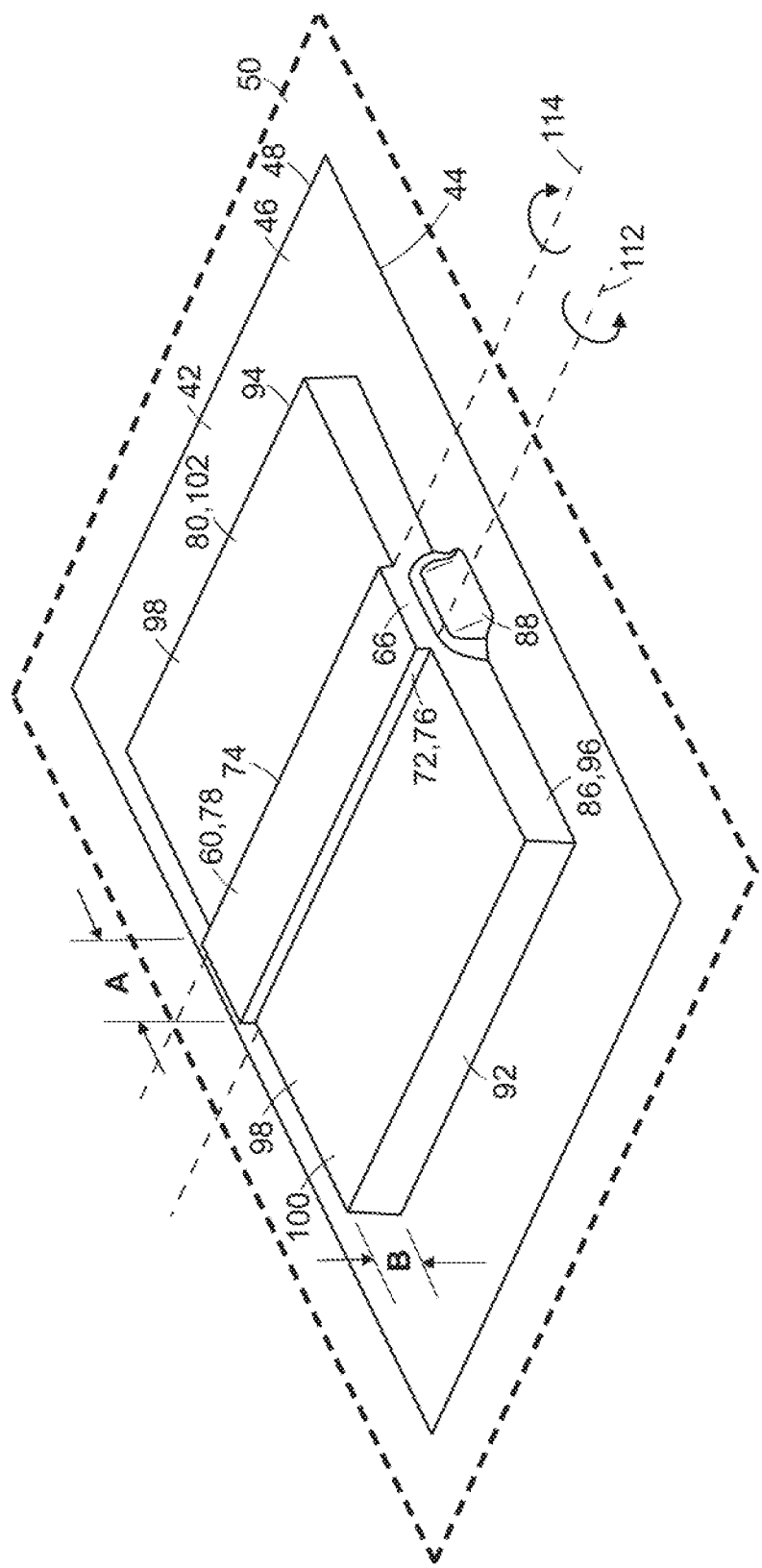
FIG. 9 is a perspective view of the sheet of FIG. 6 illustrating fold lines about which the sheet is folded in subsequent forming steps.

In addition, the sheet 42 is folded in a second direction along a second fold line 114 (step 208, FIG. 9). The second fold line 114 overlies or coincides with a corner defined by the intersection between the other of the first recess second sides 74 and the second recess endwall 98 within the second portion 102 of the second recess 80. The sheet 42 is folded along the second fold line 114 until the second portion 102 of the second recess 80 is generally perpendicular to the plane 50.

Figure 10:
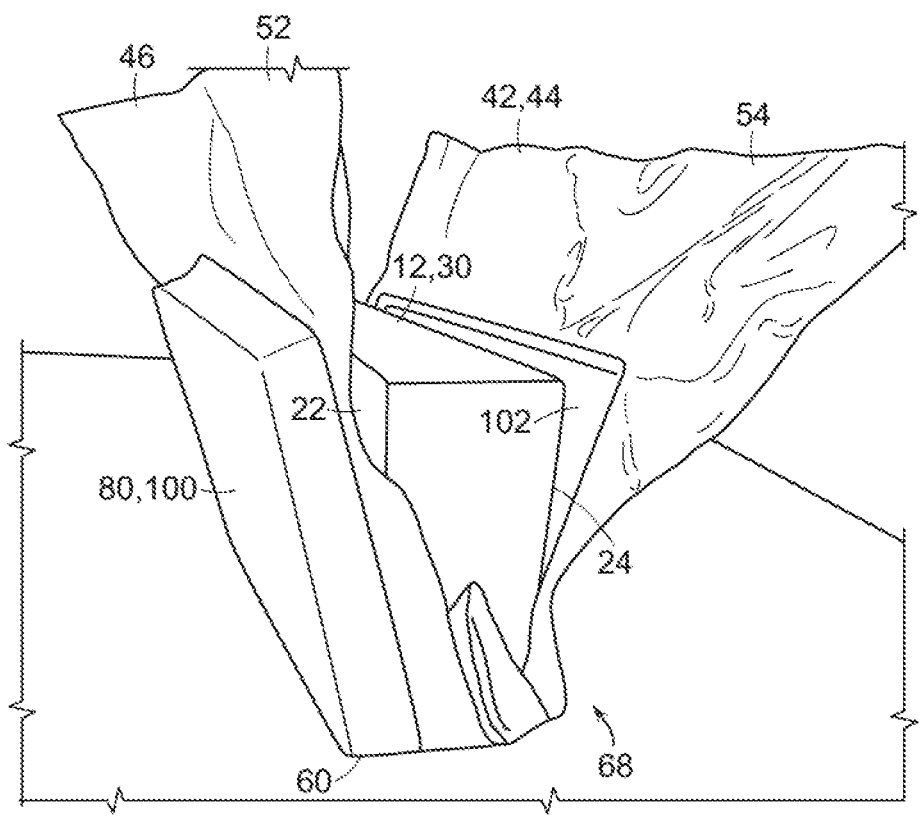
FIG. 10 is a perspective view of the sheet following a folding operation and following insertion of the electrode assembly, where the electrode assembly is illustrated schematically as a rectangular prism.

The second direction is opposed to the first direction, so that the folding operations of steps 206 and 208 result in the sheet 42 being folded generally into a U-shape in which the first portion 100 of the second recess 80 is aligned with, and opens facing, the second portion 102 of the second recess 80 (FIG. 10), where the "base" of the U corresponds to the first recess 60, and the "legs" of the U correspond to the first and second portions 100, 102 of the second recess 80 (FIG. 10). In addition, the first recess 60 opens facing the first and second portions 100, 102 of the second recess 80. In this configuration, the first sheet surface 44 provides an inner surface of the U and the second sheet surface 46 provides an outer surface of the U.

Following the step of folding the sheet 42, the electrode assembly 12 is inserted into the first recess 60 such that the first minor side 26 faces or abuts the first recess endwall 78 (Step 210, FIG. 10). The electrode assembly 12 is oriented within the cell housing 40 so that the first major side 22 is received in first portion 100 of the second recess 80, the second major sides 24 is received within the second portion 102 of the second recess 80, and the stack axis 20 extends through the second recess endwall 98 within each of the first and second portions 100, 102 (FIG. 7).

Other ancillary structures and components of the cell 10 may also be inserted at this time.

Once the electrode assembly 12 is positioned in the first recess 60, the first and second border regions 52, 54 of the sheet 42 are arranged so that the first sheet surface 44 within the first border region 52 abuts the first sheet surface 44 within the second border region 54.

Optionally, following the insertion step 210, a pleat 68 may be formed in the first and second border regions 52, 54 at a location corresponding to each of the discontinuities 88 (steps 212, 214). This step is used for applications in which it is desirable to have a pouch cell 10 in which one end of the cell 10 is free of flange material. The flange-free end provides a stable cell support surface, as well as a surface through which the thermal conditions of the cell 10 can be efficiently managed.

The first pleat 68 is formed in the first and second border regions 52, 54 at a location corresponding to the discontinuity 88 on one side of the first recess 60 (step 212). In particular, the portion of the sheet 42 including the discontinuity 88 is folded toward the electrode assembly 12 so as to lied against the electrode assembly 12. As a result, the sheet 42 forms the pleat 68, e.g. a "W" fold in which the sheet 42 is doubled over on itself (FIG. 10).

The second pleat (not shown) is formed in the first and second border regions 52, 54 at a location corresponding to the discontinuity 88 on a side of the first recess 60 that is opposed to the one side (step 214). In particular, the portion of the sheet 42 including the discontinuity 88 is folded toward the electrode assembly 12 so as to lied against the electrode assembly 12. As a result, the sheet 42 forms the pleat 68, e.g. a "W" fold in which the sheet 42 is doubled over on itself.

The pleats 68 allow excess material along the sheet peripheral edge 48 (e.g., between the sheet peripheral edge 48 and the first recess 60), that might otherwise protrude across a plane 50, to be tucked away.

Figure 11:
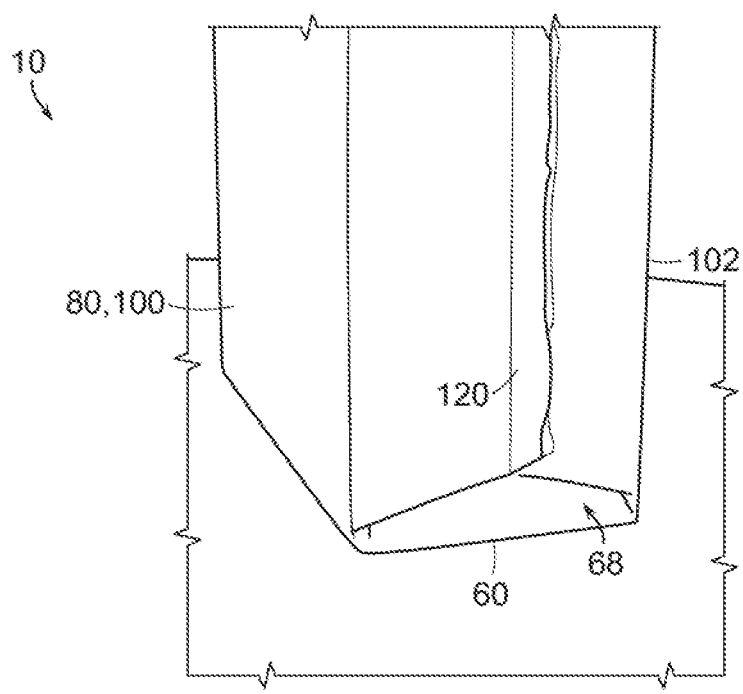
FIG. 11 is a perspective view of the sheet following a pleating operation.

Once the electrode assembly 12 is positioned in the first recess 60, the first and second border regions 52, 54 of the sheet 42 are arranged so that the first sheet surface 44 within the first border region 52 abuts the first sheet surface 44 within the second border region 54 (FIG. 11).

Figure 12:
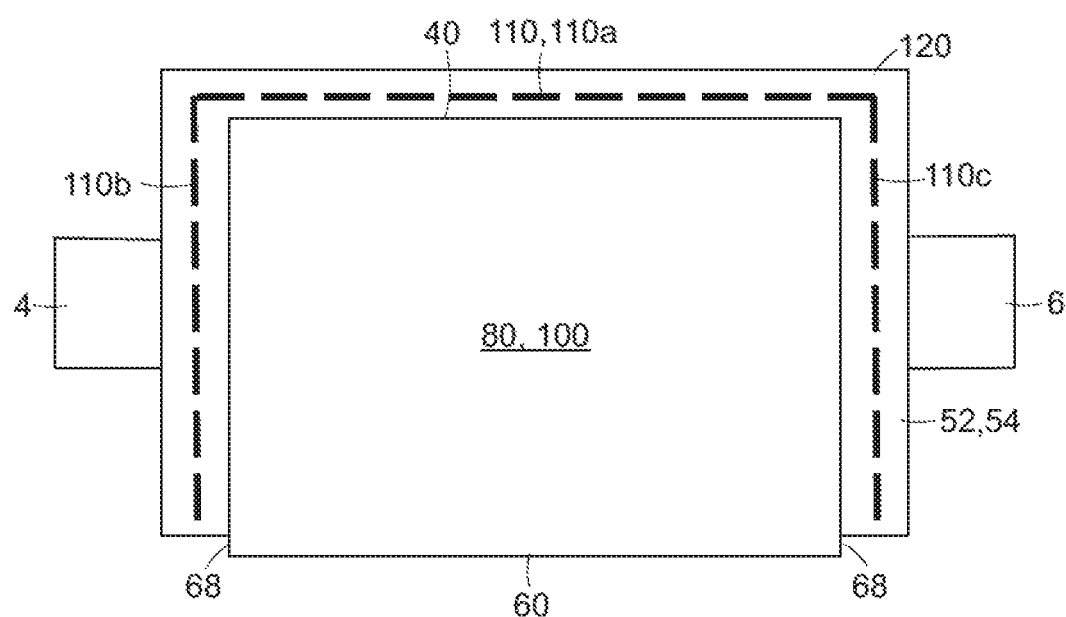
FIG. 12 is a side view of the cell housing illustrating the seal line in broken lines.
Figure 13:
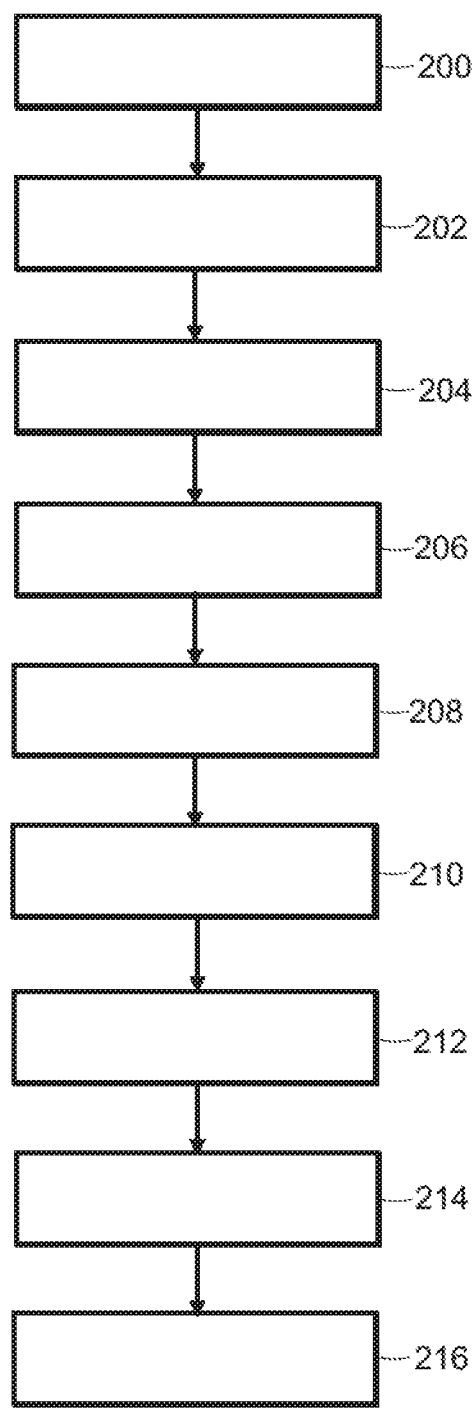
FIG. 13 is a flow chart illustrating the method steps used to form the pouch cell housing.

Following the pleat forming operations of steps 212 and 214, the first border region 52 is joined to the second border region 54 along a seal line 110 so as to form a sealed flange 120 (step 216, FIG. 12). The seal line 110 provides a closed sealed space within the cell 10. When the pleat forming operations (steps 212, 214) are performed, the step of joining a first border region 52 to the second border region 54 includes extending the seal line 110 across each pleat 68.

The seal line 110 is formed by application of heat to one or both of the first and second border regions 52, 54, and may be achieved, for example, by using by using a heat sealing device, welding, or other appropriate joining technique. In some embodiments, sealing is achieved in three linear sealing steps, one for each side of the first and second recesses 60, 80 except for the side corresponding to the first recess 60. For example, a first sealing step (step 216a) includes sealing the first and second border regions 52, 54 along a side of the cell housing 40 that is opposed to the first recess 60 (see portion 110a of the seal line 110), following by second and third sealing steps that include sealing the sides of the cell housing 40 that are perpendicular to the first recess 60 (sealing steps 216b, 216c, see portions 110b, 110c of the seal line 110). In some embodiments, the first sealing step 216a, in which the side of the cell housing 40 opposed to the first recess 60 is sealed, may be performed prior to forming the pleats 68 (FIG. 10), and the second and third sealing steps 216b, 216c are performed subsequent to forming the pleats 68.

The resulting seal line 110 surrounds the housing 40 on three sides. In some embodiments excess flange material (e.g., flange material disposed between the seal line and the case half peripheral edge) may be trimmed off (FIG. 1).

In the assembled pouch cell 10, the electrode assembly 12, as well as other ancillary components and features, including current collectors, etc., are sealed within the interior space defined between the first and second recesses 60, 80. The liquid electrolyte is added to the sealed cell 10 using conventional methods. In addition, the cell terminals 4, 6 protrude through the cell housing at the seal joint, and the seal line 110 extends across the terminals 4, 6. The cell housing 40 is sealed to the terminals 4, 6 using conventional techniques.

In the assembled pouch cell 10, the depth d(c) of the cell corresponds to the distance A between the respective second sides 72, 74 of the first recess 60. As previously mentioned, the ratio (A)/(B) is 2, where (B) is a distance between the second recess endwall 98 and the plane 50. Advantageously, the ratio (A)/(B) is set to provide a cell housing 40 that accommodates the electrode assembly 12 with minimal excess interior space.

The pouch cell housing 40 has a depth d(c) (e.g., a dimension in a direction parallel to the stack axis 20) that is greater than twice the draw depth of the material used to form the pouch cell housing. In one non-limiting example, the depth d(c) of the cell housing 40 is 36 mm. This can be compared to some conventional pouch cell housings that are formed of the same metal foil laminate material and have a maximum draw depth of about 6 mm corresponding to a cell housing depth of about 12 mm. Since the cell housing 40 has a greater depth d(c) than some conventional pouch cell housings, the cell housing 40 can accommodate more active material than the conventional pouch cell housing.

Although the material used to form a pouch cell 10 is described as a flexible, three-layer, metal laminated film having a polypropylene layer, an aluminium foil layer, and a polyethylene layer, the material used to form the pouch cell 10 may have a greater or fewer number of layers and/or use different materials to form the layers. In one example, some batteries that are used in cell phones employ a pouch cell housing that has the following three layers which are joined by a thin adhesive between adjacent layers: oriented nylon/aluminium foil/polypropylene. In another example, some batteries that are used in electric vehicles employ a pouch cell housing that has the following four layers which are joined by a thin adhesive between adjacent layers: polyethylene terephthalate/oriented nylon/aluminium foil/polypropylene.

Although the cell 10 is described herein as being a lithium-ion cell, the cell 10 is not limited to having a lithium-ion chemistry. For example, the cell 10 may have other chemistries, including aluminum-ion, alkaline, nickel-cadmium, nickel metal hydride, or other appropriate chemistry.

In the illustrated embodiment, the positive electrodes 14, separators 18 and negative electrodes 16 are individual plates that are arranged in a stacked or layered configuration. It is understood, however, that the arrangement of the positive electrodes 14, separators 18 and negative electrodes 16 is not limited to a stacked configuration. For example, the positive electrodes 14, separators 18 and negative electrodes 16 may be continuous webs that are layered and arranged in a Z-folded configuration, a rolled and flattened configuration (e.g., jelly roll configuration), a cross-woven configuration, or any other suitable configuration.

In the illustrated embodiment, the electrode assembly 12 is sealed within the housing 40 along with a liquid electrolyte. However, the cell 10 is not limited to employing a liquid electrolyte. For example, in some embodiments, the electrolyte is a gel or a solid. In some embodiments, the solid electrolyte also functions as the separator.

In the illustrated embodiment, the material used to form the sheet 42 is a flexible, three-layer, metal laminated film that includes a central layer of an aluminium foil 7 that is sandwiched between a layer of polyamide 5 and a layer of polypropylene 9. It is understood, however, that the material used to form the sheet 42 is not limited to this construction, and may include a greater or fewer number of layers and/or include different materials when forming the layers.

In the method described above, the first recess 60 is formed in the sheet 42 as an initial forming step, and the second recess 80 is formed in the sheet as a subsequent forming step. It is contemplated, however, that the second recess 80 may be formed as the initial forming step, and the first recess 60 may be formed in a subsequent forming step, or alternatively, that the first and second recesses 60, 80 may be formed simultaneously in single forming step, for example using a single punch tool having an appropriately shaped (e.g., stepped) forming portion.

Selective illustrative embodiments of the apparatus and method are described above in some detail. It should be understood that only structures considered necessary for clarifying the apparatus and method have been described herein. Other conventional structures, and those of ancillary and auxiliary components of the apparatus and method, are assumed to be known and understood by those skilled in the art. Moreover, while working examples of the apparatus and method have been described above, the apparatus and/or method is not limited to the working examples described above, but various design alterations may be carried out without departing from the devices as set forth in the claims.

I claim:

1. An electrochemical cell comprising a pouch cell housing and an electrode assembly disposed in the housing, wherein the electrode assembly comprises a positive electrode, a negative electrode and a separator disposed between the positive electrode and the negative electrode, and the positive electrode, the separator and the negative electrode are stacked along a stack axis, the electrode assembly further comprises a first major side that is perpendicular to the stack axis, a second major side that is parallel to the first major side, and a first minor side that is parallel to the stack axis and extends between the first major side and the second major side, and the housing comprises a single sheet of a metal foil laminate material, and the sheet includes a first sheet surface, a second sheet surface that is opposed to the first sheet surface, and a sheet peripheral edge that extends between the first sheet surface and the second sheet surface, a first recess formed in the first sheet surface, the first recess including a pair of parallel first recess first sides, a pair of parallel first recess second sides that are perpendicular to the first recess first sides, and a first recess endwall, where the first recess first sides and the first recess second sides adjoin the first recess endwall and cooperate to surround the first recess endwall, and a second recess formed in the first sheet surface in a region of the sheet that includes the first recess, the second recess including a pair of parallel second recess first sides, a pair of parallel second recess second sides that are perpendicular to the second recess first sides, and a second recess endwall, where the second recess first sides and the second recess second sides adjoin the second recess endwall and cooperate to surround the second recess endwall, wherein prior to folding the sheet to form an enclosure that receives the electrode assembly, the sheet peripheral edge resides in a plane, the second recess endwall is offset relative to the plane, the first recess endwall is offset relative to the plane such that the second recess endwall is disposed between the first recess endwall and the plane along an axis that is perpendicular to the plane, the first recess first sides are parallel to the second recess first sides, the first recess second sides are parallel to the second recess second sides,
the first recess first sides are coplanar with the second recess first sides, and
the second recess second sides are disposed between the sheet peripheral edge and the first recess second sides along an axis that is parallel to the plane, whereby
a first portion of the second recess is provided between the second recess second side and the first recess second side on one side of the first recess, and
a second portion of the second recess is provided between the second recess second side and the first recess second side on an opposed side of the first recess, and
following folding the sheet to form the enclosure that receives the electrode assembly,
the electrode assembly is disposed in the enclosure such that the first minor side is disposed in the first recess such that the first minor side faces the first recess endwall, the first major side is disposed in the first portion of the second recess such that the first portion of the second recess faces the first major side, the second major side is disposed in the second portion of the second recess such that the second portion of the second recess faces the second major side, and a first region of the sheet that is disposed between the first portion of the second recess and the sheet peripheral edge is bonded to a second region of the sheet that is disposed between the second portion of the second recess and the sheet peripheral edge.

2. The electrochemical cell of claim 1, wherein the ratio (A)/(B) is 2, where (A) is a distance between the respective first recess second sides, and (B) is a distance between the second recess endwall and the plane.

3. The electrochemical cell of claim 1, wherein following folding the sheet to form the enclosure that receives the electrode assembly, the first region and the second region as bonded together form a flange that protrudes outward along three sides of the cell housing so as to overlie a second minor side of the electrode assembly, a third minor side of the electrode assembly, and a fourth minor side of the electrode assembly, and
a fourth side of the cell housing that overlies the first minor side of the electrode assembly is free of the flange.

4. The electrochemical cell of claim 1, wherein the first and second recesses each have the shape of a rectangular prism.

5. The electrochemical cell of claim 1, wherein the pouch cell housing has a dimension in a direction parallel to the stack axis that is greater than twice the draw depth of the material used to form the pouch cell housing.

6. The electrochemical cell of claim 1, wherein the metal foil laminate material comprises an aluminum foil layer that is sandwiched between polymer layers.

7. A method of forming an electrochemical cell having a pouch cell housing, the method steps comprising
providing a sheet of a metal foil laminate material, the sheet including a first sheet surface that resides in a plane, a second sheet surface that is opposed to the first sheet surface, and a sheet peripheral edge that extends between the first sheet surface and the second sheet surface,
providing an electrode assembly, the electrode assembly comprising a positive electrode, a negative electrode and a separator disposed between the positive electrode and the negative electrode, wherein the positive electrode, the separator and the negative electrode are stacked along a stack axis, and the electrode assembly further comprises a first major side that is perpendicular to the stack axis, a second major side that is parallel to the first major side, and a first minor side that is parallel to the stack axis and extends between the first major side and the second major side,
forming a first recess in the first sheet surface at a first location, the first recess comprising:
a pair of parallel first recess first sides,
a pair of parallel first recess second sides that are perpendicular to the first recess first sides, and
a first recess endwall that is offset from, and parallel to, the plane, where the first recess first sides and the first recess second sides adjoin the first recess endwall and cooperate to surround the first recess endwall, and the first recess first sides and the first recess second sides are each spaced apart from the sheet peripheral edge,
forming a second recess in the first sheet surface at the first location, the second recess including
a pair of parallel second recess first sides,
a pair of parallel second recess second sides that are perpendicular to the second recess first sides, and
a second recess endwall that is offset from, and parallel to, the plane and the first recess endwall, wherein
the second recess first sides and the second recess second sides adjoin the second recess endwall and cooperate to surround the second recess endwall,
the second recess first sides and the second recess second sides are each spaced apart from the sheet peripheral edge,
the second recess endwall is disposed between the first recess endwall and the plane along an axis that is perpendicular to the plane,
the first recess first sides are parallel to, and coplanar with, the second recess first sides,
the first recess second sides are parallel to the second recess second sides, and
the second recess second sides are disposed between the sheet peripheral edge and the first recess second sides along an axis that is parallel to the plane, whereby a first portion of the second recess is provided between the second recess second side and the first recess second side on one side of the first recess, and a second portion of the second recess is provided between the second recess second side and the first recess second side on another side of the first recess,
placing the electrode assembly in the first recess such that the first minor side faces the first recess endwall,
folding the sheet in a first direction along a first fold line until the first portion of the second recess faces the first major side, where the first fold line is defined by an intersection of one of the first recess second sides of the pair of first recess second sides and the second endwall within the first portion of the second recess,
folding the sheet in a second direction along a second fold line until the second portion of the second recess faces the second major side, where the second fold line is defined by an intersection of another of the first recess second sides of the pair of first recess second sides and the second endwall within the second portion of the second recess, and the second direction is opposed to the first direction, and
joining a first flange portion to a second flange portion along a seal line so as to provide a sealed space within the cell in which the electrode assembly is disposed, where the first flange portion comprises a first border region of the sheet that is disposed between the first portion of the second recess and the sheet peripheral edge, and the second flange portion comprises a second border region of the sheet that is disposed between the second portion of the second recess and the sheet peripheral edge.

8. The method of claim 7, comprising the steps of
forming a first pleat in the first and second flange portions at a location corresponding to one of the first recess first sides of the pair of first recess first sides, and
forming a second pleat in the first and second flange portions at a location corresponding to another one of the first recess first sides of the pair of first recess first sides.

9. The method of claim 8, wherein the seal line extends across both first pleat and the second pleat.

10. The method of claim 7 wherein the ratio (A)/(B) is 2, where (A) is a distance between the respective second sides of the first recess, and (B) is a distance between the second recess endwall and the plane.

11. The method of claim 7 wherein following the step of joining a first flange portion to the second flange portion, the first region and the second region, as joined together, form a flange that protrudes outward along three sides of the cell housing so as to overlie a second minor side of the electrode assembly, a third minor side of the electrode assembly and a fourth minor side of the electrode assembly, and
a fourth side of the cell housing that overlies the first minor side of the electrode assembly is free of the flange.

12. The method of claim 7, wherein the first recess is formed in the sheet before the second recess is formed in the sheet.

13. The method of claim 7, wherein the metal foil laminate material comprises an aluminum foil layer that is sandwiched between polymer layers.

14. The method of claim 7, wherein the step of forming the second recess includes forming edges that are defined by the intersection of the second recess first sides with the corresponding one of the first border region and the second border region, and
providing a discontinuity in the edges at a location that coincides with the first recess first sides.

* * * * *